(12) United States Patent
Thornhill et al.

(10) Patent No.: US 8,163,945 B2
(45) Date of Patent: Apr. 24, 2012

(54) EXTRACTION OF OIL FROM FOOD WASTES

(75) Inventors: Richard Thornhill, Derbyshire (GB); Paul Pennock, Derbyshire (GB)

(73) Assignee: Agritec Systems Limited, Beech House, Great Longstone, Derbyshire (GB)

( * ) Notice: Subject to any disclaimer, the term of this patent is extended or adjusted under 35 U.S.C. 154(b) by 236 days.

(21) Appl. No.: 12/447,218

(22) PCT Filed: Oct. 24, 2007

(86) PCT No.: PCT/GB2007/004053
§ 371 (c)(1),
(2), (4) Date: Apr. 24, 2009

(87) PCT Pub. No.: WO2008/053163
PCT Pub. Date: May 8, 2008

(65) Prior Publication Data
US 2010/0029965 A1    Feb. 4, 2010

(30) Foreign Application Priority Data

Oct. 28, 2006   (GB) .................................. 0621504.0

(51) Int. Cl.
*C11B 1/00* (2006.01)

(52) U.S. Cl. ................. 554/8; 241/65; 241/68

(58) Field of Classification Search ........ 554/8; 241/65, 241/68
See application file for complete search history.

(56) References Cited

U.S. PATENT DOCUMENTS 4,335,146 A * 6/1982 Bladh ........................... 426/231

FOREIGN PATENT DOCUMENTS

| EP | 613439 | * 11/1948 |
| GB | 292327 A1 | 6/1928 |
| GB | 613439 A | 11/1948 |
| WO | 8503415 | 8/1985 |

* cited by examiner

*Primary Examiner* — Deborah D Carr
(74) *Attorney, Agent, or Firm* — Barlow, Josephs & Holmes, Ltd.

(57) ABSTRACT

Raw material such as food waste is scanned by a metal detector (11) and objects or containments removed, the food waste is then ground or macerated by a disintegrator (13), and passed to a live steam kettle (14), then passed to an in-line heater (15) wherein it is raised to and maintained at 80% for 20 minutes. The product is pumped to a three-phase decanter centrifuge (16) where it is separated into solids, water waste and tallow (oily product). The latter is pumped to storage tank (20), using a centrifugal pump (21), while water waste is discharged to effluent while solids are discharged to a container (18).

15 Claims, 1 Drawing Sheet

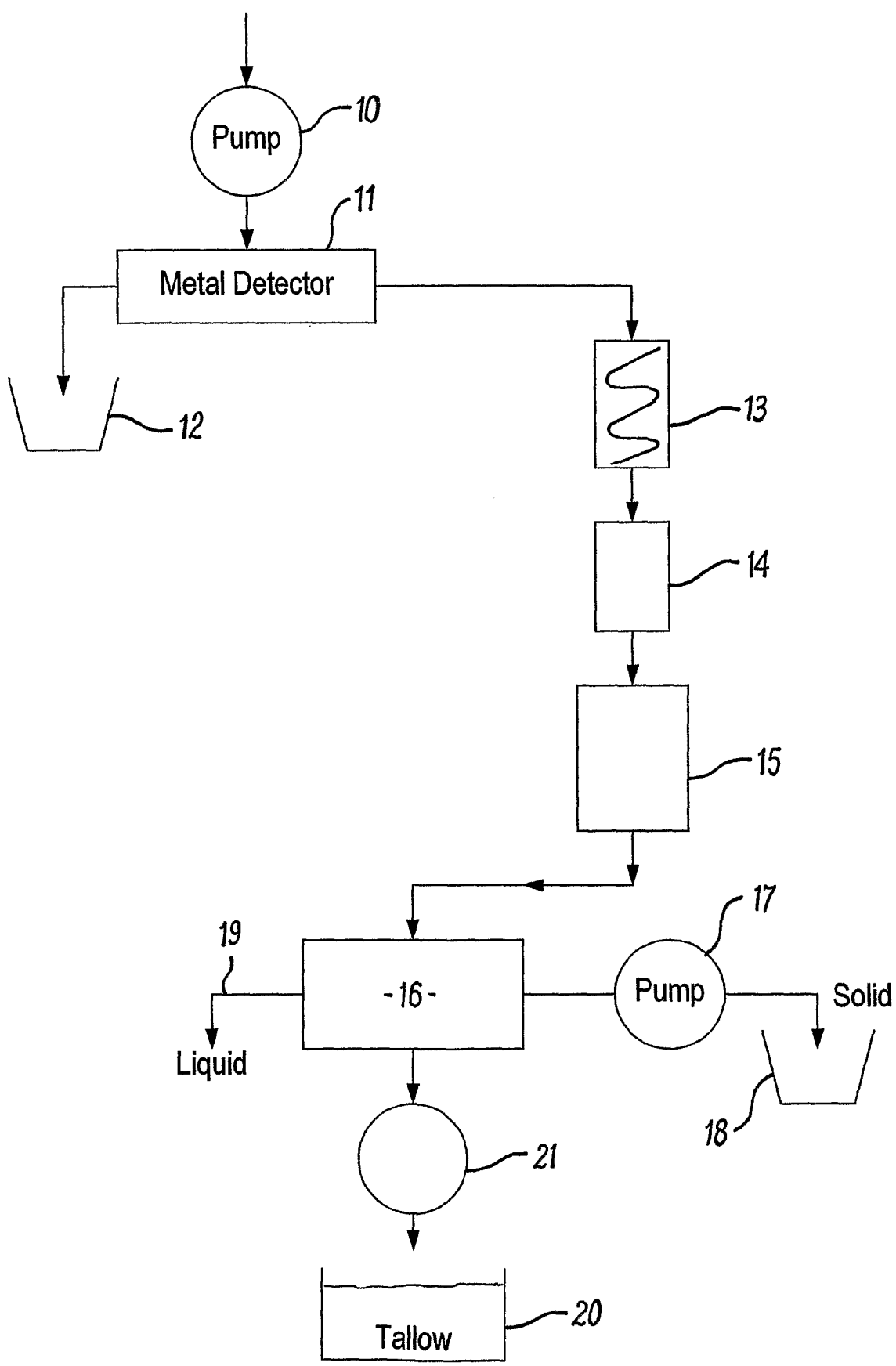

EXTRACTION OF OIL FROM FOOD WASTES

This invention relates to the extraction of oil from food wastes.

In general, it is considered desirable to extract useful products from residues such as food and organic wastes. One of the most useful materials which can be extracted are oils, so called "bio-oils" which are contained in much biological waste material, whether of animal or plant origin. A wide variety of sources of waste arise at all stages of the supply and processing chain from field to catering waste, principally in economically recoverable quantities from food processing factories, abattoirs, supermarket remainders, and catering waste arising from food preparation and food leftovers.

In World Leather, November 2003, there was described a process for turning leather manufacturing waste streams into boiler fuel. This process and the associated installation was specifically directed to the treatment of sub-cutaneous fat and other materials scraped from animal skins in preparing the skins for tanning and working into leather. The scraped fat was reduced in size in a two-step batch process, and then treated by addition of hot water and heated by an in-line indirect steam heater and cooked in batches in open tanks. Air-extraction was required due to the cooking tanks being open.

The process thus described was adapted to process the fat scrapings from hides and skins to a tallow oil which is usable as a fuel for combustion for example by boiler burners. As only one type of source material is used, which is processed in batches of fat from a single animal species this therefore has a consistent melting temperature, and needs only to be adapted to dealing with a restricted range of starting material properties.

In dealing with any and all food wastes however, it is necessary to be able to process a wide variety of materials, of animal or vegetable origin, raw, partially or fully cooked and a wide range of fats, proteins, cellulose or keratin fibres and even bones. The wastes from a catering establishment may for example contain both preparation waste such as uncooked vegetable peelings, bones and trimmings from meat including excess fat and gristle, and also left over cooked food. All these present a range of properties to the processor, and offer different proportions and types of recoverable useful oil.

It is an object of the present invention to provide a process and apparatus that is capable of extracting oil from the wide range of materials which make up organically derived wastes.

According to the invention, apparatus for extraction of oil from food wastes comprises means for finely dividing food waste, means for controlledly heating the finely divided product, and centrifugal separator means providing separate outputs for solids, liquids, and for an oily component, and for storing the oily component.

The invention also provides a method for extraction of oil from food wastes, comprising finely dividing food waste, controlledly heating the finely divided product, and separating the resulting product by means of a centrifugal separator into separate outputs for solids, liquids and for an oily component, and storing the oily component.

The oily component may comprise a mixture of animal and/or vegetable fats, and some free fatty acids and the like ranging from volatile low m.w. oils to waxy, high m.w. components. The mixture is often referred to as "tallow".

The raw material may, prior to processing be scanned with a metal detector, and any foreign bodies or metal contaminated parts removed.

The material is then preferably ground or macerated in a mincer or macerator. This may be a helical device comprising a rotor and a stator, each provided with teeth, ribs or grooves appropriate for shredding a range of materials.

The ground material may then be heated for e.g. 20 minutes to e.g. 80° C. in an in-line heater, and then pumped to a three phase decanter centrifugal separator.

The solids may be discharged by a progressive cavity pump, or other conveyor, either for further processing or waste disposal, and the water by gravity to effluent.

A centrifugal pump may be used to pump the oily component to a storage tank.

An embodiment of apparatus and a method for extraction of oil from food wastes is illustrated by way of example with reference to the accompanying drawing which is a flow diagram of the method and apparatus.

The raw material is introduced as a slurry or pulp via a pump 10 to a preliminary examination stage 11 where a metal detector is used to detect the presence of metal parts or articles in the material. This will enable foreign bodies such as cutlery items like knives or forks discarded with restaurant left overs for example, lead pellets in game carcasses and the like to be detected. When such items and contaminated material have been removed, to be deposited in a waste skip 12, the clean material is fed to a disintegrator 13 wherein the material is macerated to a uniform slurry using a mincer/macerator. This comprises one or more toothed or grooved rotors and an interdigitatingly toothed or grooved stator, between which the material is forced under pump pressure. The teeth of the mincer may be provided in a variety of shapes to cope with a range of materials.

From the disintegrator 13, the macerated material is pumped through an in-line steel kettle 14 which heats the slurry. The kettle uses live steam as its heating medium. This has the advantage that it can be precisely controlled, for example in response to a central control computer which in turn responds in accordance with a control programme, and the data received from sensors detecting characteristics such as temperature and viscosity of input and output material streams, to continuously maintain these within desired ranges.

The slurry output from the in-line kettle 14 is then passed to an in-line heater 15, wherein it is heated by being raised to and maintained at 80° C., during a dwell time of 20 minutes.

The product emerging from the heater 15 is then pumped to a separator 16 which comprises a three-phase decanter centrifuge. The centrifuge is adapted to separate the slurry into solids, water waste and tallow.

The solids are discharged by a progressive cavity pump 17 which discharges the solids to a skip or other container 18.

The liquid or water based waste is discharged by gravity to an effluent exit 19.

The tallow is pumped from the separator 16 to a separate storage tank 20 by a centrifugal pump 21.

The process operates on a continuous basis, with the material being processed being continuously fed at the input, and a continuous output of tallow and solid and liquid residues being maintained during operation.

"Tallow" refers to all oil components extracted from the input material, of whatever melting point or molecular weight, or precise structure or composition. The tallow is a blend of all the oil components, and this may vary with the nature of the source material. It may contain aliphatic and aromatic oils, and have any appropriate carbon number and range from highly volatile low m.w. oils to waxy high m.w. oils.

The process is, as noted, carried out under the control of a pre-programmed microprocessor. This includes start and stop routines, and provision for monitoring each stage, and in particular the separator centrifuge 16. The start routine brings the apparatus to working temperature and starts the various components in turn to check their operation. The system stop routine incorporates a cleaning sequence that ensures that the machine is available to start up when necessary, with no operator involvement in cleaning. The equipment of the apparatus includes flushing and other cleaning apparatus which operates under the control of this sequence.

The microprocessor has a waterproof touch screen to provide an operator interface, and to display information concerning the performance of the operation.

The operator, using the input interface provided by the touch screen can set various parameters such as precise operating temperatures, and throughput rates, dwell times etc, and provision is also provided for data logging from the microprocessor.

The apparatus is constructed on a closed frame which provides a mounting for all the various components. The frame is of monocoque construction and manufactured from steel which has been specially coated, and fitted with feet, and with mounting brackets for all the components.

All transfer steps are effected in sealed pipes to prevent any odour emissions from the machine, and the latter is also fully weather protected and is designed to be installed outdoors on a level concrete base. The dimensions of the apparatus are similar to that of a shipping container, for example from 6 to 12 metres long, depending on capacity.

The apparatus is intended to be supplied as a ready to operate unit, and can be sited where the food waste material is produced at a food processing plant, an abattoir, or a large scale catering establishment such as an institutional kitchen.

The tallow may be processed after collection to make useful products, including, refining for use as fuel oil such as bio-diesel or lubricants, or as a fuel for power generation.

The invention claimed is:

1. Apparatus for extraction of oil from food wastes, comprising a divider configured and arranged to finely divide food wastes, an in-line live steam kettle for controlledly heating the finely divided product, and a three-phase decanter centrifugal separator providing separate outputs for solids, liquids, and for an oily component, and means for storing the oily component.

2. Apparatus according to claim 1, including a metal detector, to detect any foreign bodies of metal contamination in the raw material prior to processing.

3. Apparatus according to claim 1 wherein the divider is a mincer.

4. Apparatus according to claim 1, wherein divider comprises a helical device comprising a rotor and a stator, each provided with teeth, ribs or grooves.

5. Apparatus according to claim 1, comprising an in-line heater arranged to heat the finely divided product after it has been heated by the in-line live steam kettle.

6. Apparatus according to claim 1, wherein the solids are discharged from the three-phase decanter centrifugal separator by a progressive cavity pump, and water by gravity to effluent.

7. Apparatus according to claim 1 including a centrifugal pump to pump the oily component to a storage tank.

8. A method for extraction of oil from food wastes comprising finely dividing food waste; controlledly heating the finely divided product by an in-line live steam kettle, and separating the resulting product by means of a centrifugal separator into separate outputs for solids, liquids and for an oily component, and storing the oily component, wherein the centrifugal separator is a three phase decanter centrifugal separator providing a continuous output of solids, liquids and oily component.

9. A method according to claim 2, wherein the raw material is scanned, prior to processing, with a metal detector, and any foreign bodies or metal contaminated parts removed.

10. A method according to claim 8, wherein the finely divided product is heated by an in-line heater after it has been heated by the in-line live steam kettle.

11. A method according to claim 10 wherein the divided material is next heated in the in-line heater for 20 minutes to up to 80° C.

12. A method according to claim 8 wherein the solids are discharged by a progressive cavity pump for waste disposal or further processing, and water by gravity to effluent.

13. A method according to claim 12 wherein a centrifugal pump is used to pump the oily component.

14. Apparatus according to claim 1 wherein the divider is a macerator.

15. Apparatus according to claim 1 wherein the divider is a disintegrator.

* * * * *